3,487,389
SELF-CLOCKING DATA RECORDING TRANSMISSION SYSTEM

David Thomas Gwillim and Arye Leib Freedman, Ilford, England, assignors to The Plessey Company Limited, Ilford, Essex, England, a British company Filed Oct. 14, 1966, Ser. No. 586,839
Claims priority, application Great Britain, Oct. 15, 1965, 43,907/65
Int. Cl. G11b 5/00
U.S. Cl. 340—174.1 5 Claims

ABSTRACT OF THE DISCLOSURE

A system in which information consisting of elementary "bits" is coded in the form of significant changes in state in an information carrying medium, in which when there is an absence in the information of a change in state for a period corresponding to a predetermined number of elementary "bits," there is introduced a further change in state in addition to the changes in state due to the elementary "bits" of information, said further changes in state being used for self-clocking purposes.

This invention relates to data recording/reproducing and/or transmission systems in which information is recorded on a magnetic medium, such as magnetic tape, by significant changes in the state of magnetisation of data storage elements of the tape, or such information may be transmitted over a transmission line in the form of time-displaced changes in potential.

In the case of magnetic recording/reproducing systems employing magnetic tape it is well known to provide the tape with a plurality of longitudinally extending magnetic tracks. Each of these magnetic tracks defines a series of data storage elements each capable of storing a "bit" of information and for the purpose of synchronising the tape to ensure that reading heads associated with respective data carrying tracks are brought effectively into operation at the correct instant in time, one of the tracks known as a clocking track is provided with regularly recurring changes in magnetisation (one change per storage element) along its length for controlling the reading heads. The provision of a separate clocking track enables variations in speed of the magnetic tape and differences in the lengths of storage elements to be ignored. In another well-known system an additional track known as the "odd-parity" track serves both for synchronising and error detection purposes. In both of these known systems additional tracks are provided for clocking purposes and the present invention has in view a data recording/reproducing and/or transmission system which is self-clocking and which obviates the need for additional tracks as described above in the case of magnetic tape recording/reproducing systems.

According to the present invention there is provided a recording/reproducing and/or transmission system in which data is recorded or transmitted in the form of significant changes in state in an information carrying medium, such system comprising means for encoding data for recording or transmission purposes and including means responsive to the absence in the encoded information of a change in state for a time period corresponding to a predetermined number of information-carrying elements or time-displaced elements and effective for introducing a change of state of time period corresponding to one or more of said elements into the encoded information for self-clocking purposes with the following information consequentially being delayed by the last-mentioned time period.

Since, in accordance with the present invention a number of self-clocking "bits" are deliberately introduced into the encoded information at predetermined instants it will be necessary at the reading out stage or receiver end of the transmission line, as the case may be, for decoding means to identify such self-clocking "bits" and to reject these as part of the required data. For the purpose of rejecting the self-clocking "bits" a timing arrangement may be provided capable of timing the period during which there is no change in state and upon timing the period corresponding to said predetermined number of information-carrying elements the time means responds to inhibit the next change of state in the information-carrying medium corresponding to the self-clocking pulse from being included in the output of the decoding means as part of the read out or received information.

The particular number of information-carrying elements or corresponding time periods in or during which there is no change of state occurring before the introduction of a self-clocking change of state will depend on a number of factors including the constancy of the tape speed in the case of magnetic recording systems and the desired efficiency of the system, as will hereinafter be apparent.

By way of example the present invention as applied to a self-clocking magnetic data recording/reproducing system will now be described with reference to the accompanying block schematic drawing, in which.

The circuits shown generally in block form are typical of these in widespread use and consequently they will not be individually described in detail.

Figure 1:
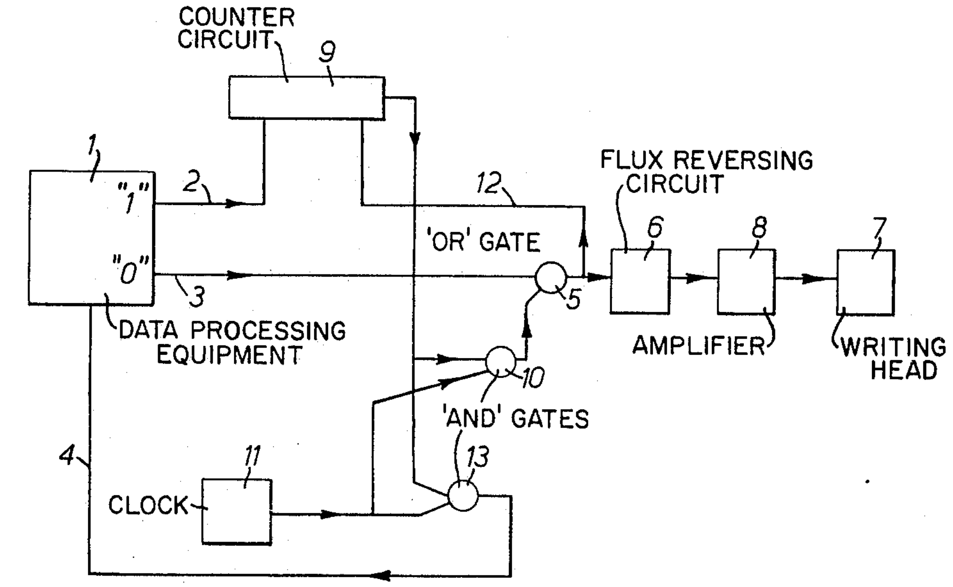
FIGURE 1 is a block schematic diagram of a magnetic data recording system according to the present invention.

Referring to FIGURE 1 of the drawings, data processing equipment 1 is arranged to apply alternatively to conductors 2 and 3 electric signals corresponding to "1" and "0" bits respectively of a binary system. Electric signals are applied successively to conductors 2 and 3 according to the data to be recorded so long as "data accept" pulses are received by the data processing equipment over a "data accept" conductor 4.

An electric signal applied to the "0" bit conductor 3 is normally arranged to pass through an "OR" gate 5 into a flux reversing circuit arrangement 6 which responds to the input signal to reverse the direction of current fed to a writing head 7 from an amplifier 8. In this way a change of state of magnetisation will be produced in tape moving past the writing head 7.

An electric signal applied to the "1" bit conductor 2, however, is fed to a counter circuit 9, which may for example comprise a plurality of transistor bistable circuits. This counter 9 responds each time it receives a signal over conductor 2 and when it has counted a number of signals "*n*" it delivers an output signal to an "AND" gate 10. Upon receiving the next clock pulse from clock 11, which may comprise a crystal oscillator or simply a flip-flop circuit device, the gate 10 opens and a pulse is accordingly applied through the "OR" gate 5 to the flux reversing circuit 6. Thus after "*n*" consecutive signals on conductor 2 without an intervening signal applied to the "0" conductor 3, a change of state or flux reversal is produced in the tape by feeding a pulse to the flux reversing circuit 6. It is this change of state which provides self-clocking means for synchronisation purposes when the information applied to the tape is being read out as will later be described.

It will be seen from the drawing that the counter 9 is re-set over conductor 12 by each flux reversal output from the "OR" gate 5 and in this way the counter only counts a plurality of consecutive signals applied to the conductor 2. In addition the output from the counter 9 after counting "$n$" "1" bits on conductor 2 is also applied to an "AND" gate 13 in order to inhibit the gate and prevent the next occurring clock pulse from clock 11 from being applied to the "data accept" conductor 4. In this way the application of new data to the conductors 2 and 3 is delayed to allow the introduction of the self-clocking change in state of magnetisation into the coded data stream. This inhibit condition will be removed, however, to enable further signals to be applied to the conductors 2 and 3 when the counter 9 is reset to zero consequent upon an output being derived from "OR" gate 5 when pulsed from the "AND" gate 10.

From the foregoing it will be appreciated that the data written into the magnetic tape consists of a series of binary elements or "bits" with changes in magnetisation representing "0" bits and no changes in magnetisation representing "1" bits, the series including additional "0" bits or changes in magnetisation constituting self-clocking bits which form no part of the data required to be read out from the tape.

Figure 2:
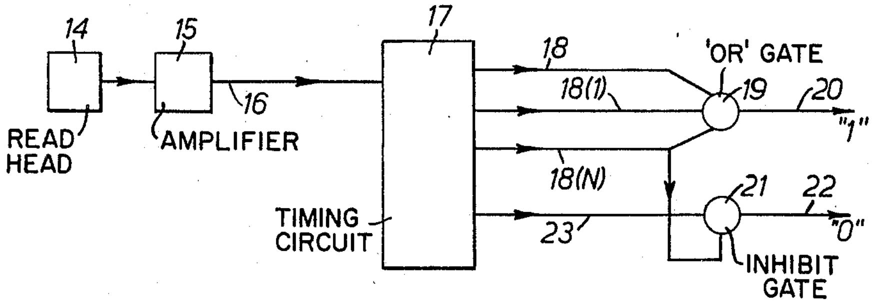
FIGURE 2 is a block schematic diagram of a magnetic data reproducing system according to the present invention.

Turning now to the read out apparatus shown in FIGURE 2, this may include a read head 14 the output of which is applied to a read amplifier arrangement 15 from which indications of flux reversals in the tape are given on conductor 16 in the form of electric signals, these signals being applied to the input of a timing circuit arrangement 17. This timing arrangement which may comprise monostable circuits or even delay lines or oscillator (e.g. crystal) controlled counters is arranged to time the intervals between electric signals corresponding to flux reversals in the tape signifying "0" bits. In this connection the timing arrangement may be arranged to provide an output after timing each time period, corresponding to the passage of an information carrying element of the tape past the head 14 without a change of state of magnetisation. In this way outputs on conductors 18, 18 (1), 18 ($n$) which are fed through an "OR" gate 19 to output conductor 20 appertaining to "1" bits, according to whether there is one single "1" bit, or two or "$n$" consecutive "1" bits. On timing "$n$" consecutive "1" bits the output from the timing arrangement on the conductor 18($n$) is passed through the "OR" gate 19 but it also inhibits a gate 21 which is normally open to pass electric signals in respect of "0" bits to an output conductor 22 appertaining to "0" bits. Since from the foregoing description it will be recalled that a change of magnetisation or "0" bit was introduced in the encoded data for self-clocking purposes after "$n$" consecutive "1" bits, the next "0" bit received by the timing arrangement constitutes the self-clocking bit. This bit produces in the usual way a flux reversal signal on conductor 23 but this signal is inhibited by the previous closure of the gate 21 and consequently the self-clocking bit is rejected from the data output from the read apparatus.

The total number of self-clocking bits included in a data stream will of course depend upon the nature of the data required to be recorded and/or reproduced but the frequency of the self-clocking bits assuming a series of consecutive "no changes" in magnetisation, and thus "$n$," will be chosen in dependence upon the constancy of the tape speed and the accuracy of the timing arrangements in the apparatus.

It will be understood that the introduction of self-clocking bits inevitably extends the length of the tape required for a given amount of information and that the efficiency will of course depend upon the value of "$n$."

The efficiency of a magnetic tape having adjacent storage elements for storing "0" and "1" bits to provide a binary code is unity.

To determine the efficiency of coded information including self-clocking bits according to the present invention consider a large series of bits and take any bit remote from the front end of the series.

A self clocking bit will follow only if any of the following conditions are satisfied:

(a) The bit itself is a "1," the preceding $n-1$ bits are "1's," the bit before that is "0."
(b) The bit itself is a "1," the preceding $2n-1$ bits are "1's," the bit before that is "0."
(c) The bit itself is a "1," the preceding $3n-1$ bits are "1's," the bit before that is "0."

The chances of these conditions being satisfied are:

(a) 1 in $2^{n+1}$
(b) 1 in $2^{2n+1}$
(c) 1 in $2^{3n+1}$

These terms form the first three terms of an infinite geometric progression of first term $1/2^{n+1}$, of ratio $(\frac{1}{2})^n$. The series is convergent and the sum is:

$$\frac{\frac{1}{2^{n+1}}}{1-(\frac{1}{2})^n}$$

Hence, the total chance of a bit being followed by a reclocking pulse is:

$$1 \text{ in } 2^{n+1}(1-(\tfrac{1}{2})^n)$$

i.e. on average 1 in $2^{n+1}(1-(\frac{1}{2})^n)$ bits will be followed by a re-clocking pulse.

The efficiency is thus:

$$\frac{2^{n+1}(1-(\frac{1}{2})^n)}{2^{n+1}(1-(\frac{1}{2})^n)+1}=\frac{2^{n+1}-2}{2^{n+1}-1}$$

Efficiency is obviously at a minimum when the information is all "1's." Thus if $n=1$ and the information is all "1's," the effieciency will be ½. In general the minimum efficiency is given by $$\frac{n}{n+1}$$

This is summarised in the following table.

| $n$ | Average efficiency | Minimum efficiency |
|---|---|---|
| 1 | ⅔ | ½ |
| 2 | 6/7 | ⅔ |
| 3 | 14/15 | ¾ |
| 4 | 30/31 | ⅘ |

This type of code has the property that for a given tape (or transmission) speed the data rate varies between that given by an efficiency of unity and the minimum efficiency. With practical tape speeds, 3 could be a suitable value for $n$. This case is illustrated by the following example:

| | | | | | | | | | | | | | | |
|---|---|---|---|---|---|---|---|---|---|---|---|---|---|---|
| Binary number to be recorded | 0 | 1 | 0 | 1 | 1 | 1 | | 1 | 0 | 1 | 1 | 1 | 0 | |
| Recorded pattern | *c* | *d* | *c* | *d* | *d* | *d* | *c'* | *d* | *c* | *d* | *d* | *d* | *c* | *c* |

where "*c*" denotes an element with a change of magnetisation and "*d*" an element without one. Changes marked with an apostrophy are disregarded as far as the information goes during the decoding since these constitute self-clocking "bits."

The average efficiency in this case is 14/15.

Figure 3:
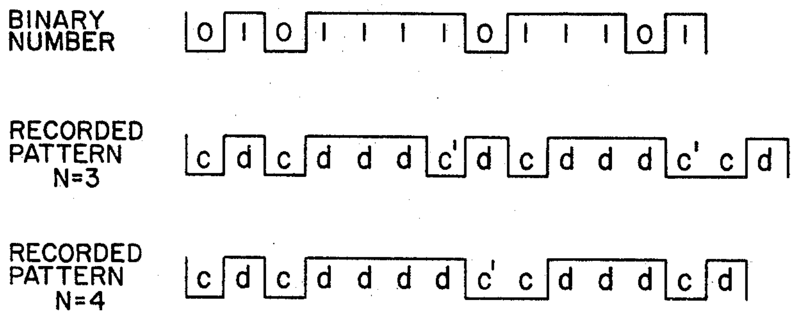
FIGURES 3 and 4 each show waveforms of typical binary members and the corresponding recorded pattern afforded by the system of FIGURE 1.
Figure 4:
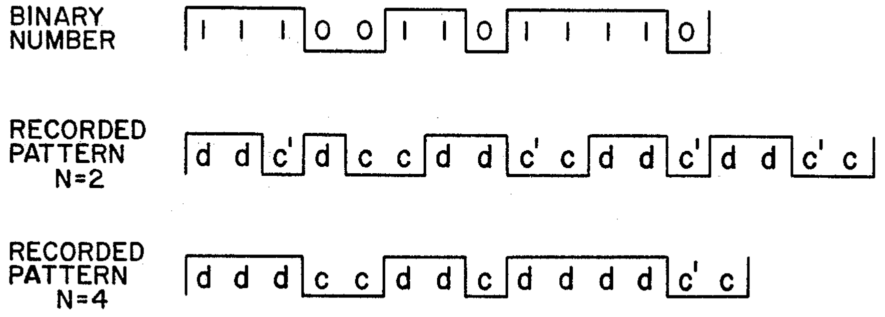

FIGURE 3 and FIGURE 4 each show waveforms of typical binary numbers with their recorded pattern for different, arbitrarily chosen, values of N.

What we claim is:

1. A system in which information consisting of elementary "bits" is coded in the form of significant changes in state in an information carrying medium, comprising coding means, to which said information is applied, said coding means being effective for encoding said information into significant changes in state in an information carrying medium, counting means to which said information is also applied and which is responsive to said information for affordng an output signal when there is an absence in said information of change in state corresponding to a predetermined number of elementary "bits," and means connected to said coding means and operable in response to said output signal for causing said coding means to introduce a further change in state in said information carrying medium in addition to the changes in state due to the elementary "bits" of information, said further changes in state being used for self-clocking purposes.

2. A system as claimed in claim 1 in which the information carrying medium is a magnetic tape and in which the information is encoded by changing the state of magnetisation of the magnetic tape.

3. A system as claimed in claim 2, in which the counting means includes a counter which is effective for counting the elementary "bits" of information corresponding to one of said states of magnetisation, and in which the means connected to the coding means includes clock pulse means which is operable in response to the output signal of the counting means for energising the coding means so that the magnetisation of the magnetic tape is caused to be changed when said counter has counted a predetermined number "bits" without a change of magnetisation occurring.

4. A system as claimed in claim 2, comprising information delay means to which the information is applied, the information delay means being responsive to the output from the clock pulse means and effective for delaying said information.

5. A system as claimed in claim 1, including a read head from which is derived a signal corresponding to the state of magnetisation of said magnetic tape, timing means effective for timing the period corresponding to one of the states of magnetisation, and for providing an output when a period corresponding to a predetermined number of elementary "bits" has been timed without a change in state occurring, and inhibit means to which said output is applied, the inhibit means being effective for inhibiting the signal corresponding to the next elementary "bit" following the period corresponding to the predetermined number of elementary "bits."

References Cited

UNITED STATES PATENTS 3,377,583 4/1968 Sims ------------- 340—174.1

BERNARD KONICK, Primary Examiner

W. F. WHITE, Assistant Examiner